(12) United States Patent
Zhao et al.

(10) Patent No.: US 12,308,465 B2
(45) Date of Patent: May 20, 2025

(54) BATTERY

(71) Applicant: CALB Co., Ltd., Jiangsu (CN)

(72) Inventors: Hao Zhao, Changzhou (CN); Jiuling Xu, Changzhou (CN); Yongjie Zhang, Luoyang (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 519 days.

(21) Appl. No.: 17/903,036

(22) Filed: Sep. 5, 2022

(65) Prior Publication Data
US 2023/0411771 A1 Dec. 21, 2023

(30) Foreign Application Priority Data

Jun. 20, 2022 (CN) .................. 202210699635.X

(51) Int. Cl.
*H01M 50/342* (2021.01)
*H01M 50/102* (2021.01)
*H01M 50/169* (2021.01)

(52) U.S. Cl.
CPC ..... *H01M 50/3425* (2021.01); *H01M 50/102* (2021.01); *H01M 50/169* (2021.01); *H01M 2200/20* (2013.01)

(58) Field of Classification Search
CPC ........... H01M 50/342; H01M 50/3425; H01M 50/102; H01M 50/103; H01M 50/105; H01M 50/169; H01M 2200/20
See application file for complete search history.

(56) References Cited

U.S. PATENT DOCUMENTS

| 2003/0077505 | A1 | 4/2003 | Goda et al. |
| 2005/0069760 | A1* | 3/2005 | Somatomo .......... H01M 50/147 429/175 |
| 2007/0099070 | A1 | 5/2007 | Aizawa et al. |
| 2014/0205877 | A1 | 7/2014 | Kim |
| 2015/0111068 | A1* | 4/2015 | Seong ............... H01M 10/0436 429/7 |
| 2021/0328304 | A1 | 10/2021 | You et al. |

OTHER PUBLICATIONS

"Search Report of Europe Counterpart Application", issued on Sep. 20, 2023, p. 1-p. 9.

* cited by examiner

*Primary Examiner* — Eugenia Wang
(74) *Attorney, Agent, or Firm* — JCIP GLOBAL INC.

(57) ABSTRACT

A battery includes a battery casing and an explosion-proof valve. The battery casing includes a first casing member and a second casing member, and the first casing member and the second casing member are welded to form a welded connection region between the first casing member and the second casing member. The welded connection region includes a first region, a second region, and a corner region, and two ends of the corner region are respectively connected to the first region and the second region. The explosion-proof valve is disposed at a corner position of a surface of the first casing member and adjacent to the welded connection region.

25 Claims, 7 Drawing Sheets

BATTERY

CROSS-REFERENCE TO RELATED APPLICATION

This application claims the priority benefit of China application no. 202210699635.X, filed on Jun. 20, 2022. The entirety of the above-mentioned patent application is hereby incorporated by reference herein and made a part of this specification.

BACKGROUND

Technical Field

The disclosure relates to the technical field of batteries, and in particular, relates to a battery.

Description of Related Art

Most batteries include explosion-proof valves, which are used to release the pressure of the batteries, thereby ensuring the safety performance of the batteries.

In the related art, the explosion-proof valves are installed on the battery casing to shield the explosion-proof holes. When the internal pressure of the battery reaches a specific level, the explosion-proof valves explode to achieve pressure relief. However, due to the limitation of the installation position of the explosion-proof valves, the problem of poor explosion-proof effect may occur, so that the safety performance of the battery is affected.

SUMMARY

The disclosure provides a battery.

The battery includes a battery casing and an explosion-proof valve. The battery casing includes a first casing member and a second casing member, and the first casing member and the second casing member are welded to form a welded connection region between the first casing member and the second casing member. The welded connection region includes a first region, a second region, and a corner region, and two ends of the corner region are respectively connected to the first region and the second region. The explosion-proof valve is disposed at a corner position of a surface of the first casing member, and is adjacent to the welded connection region. A maximum vertical distance between a side of the explosion-proof valve facing the welded connection region and the first region is a, a maximum vertical distance between the side of the explosion-proof valve facing the welded connection region and the second region is b, and a minimum vertical distance between the side of the explosion-proof valve facing the welded connection region and the corner region is c, and $0.8 \leq a/b \leq 1.2$, $a < c$, and $b < c$ are satisfied.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
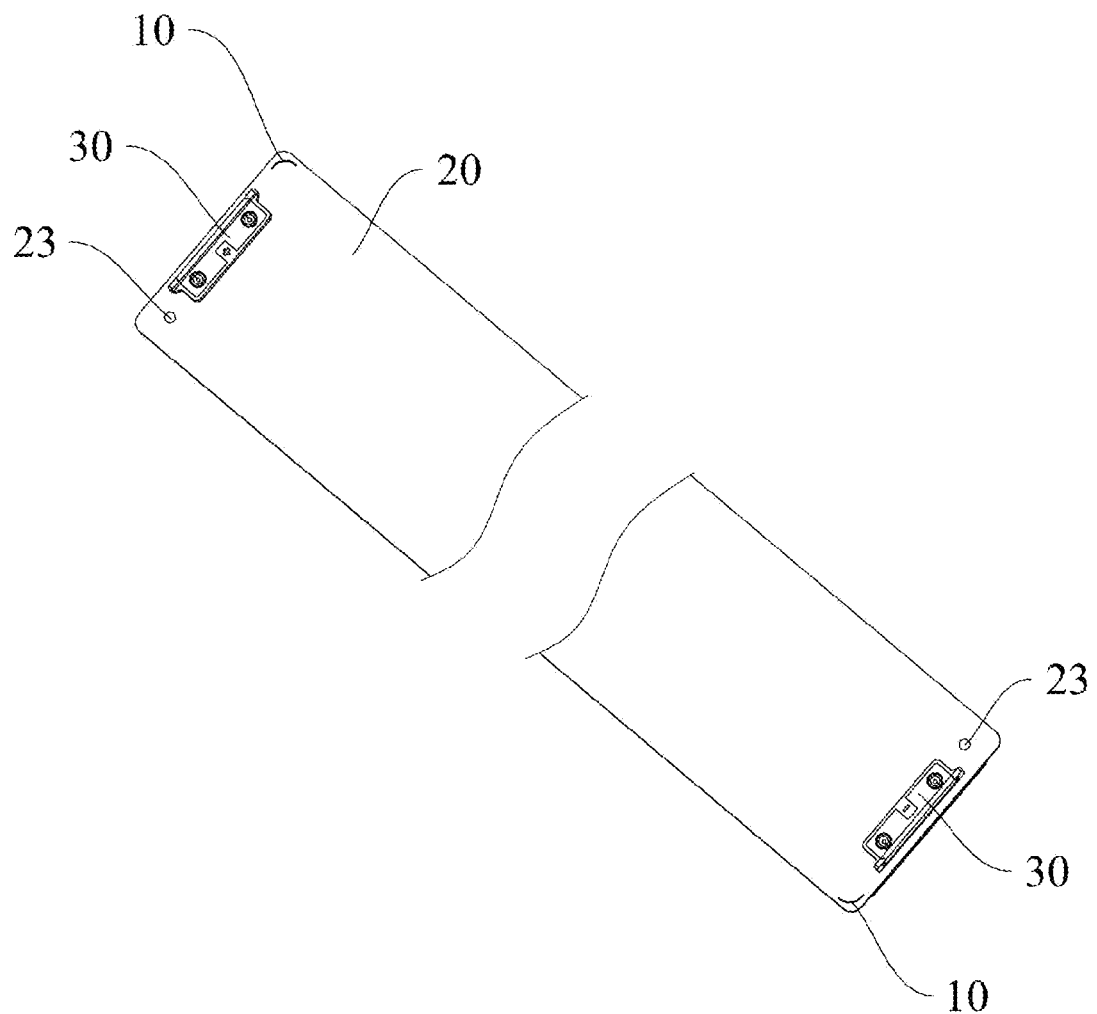
FIG. 1 is a schematic view illustrating a structure of a portion of a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a battery. With reference to FIG. 1 to FIG. 8, the battery includes a battery casing 20 and an explosion-proof valve 10. The battery casing 20 includes a first casing member 25 and a second casing member 26, and the first casing member 25 and the second casing member 26 are welded to form a welded connection region 27 between the first casing member 25 and the second casing member 26. The welded connection region 27 includes a first region 271, a second region 272, and a corner region 273, and two ends of the corner region 273 are respectively connected to the first region 271 and the second region 272. The explosion-proof valve 10 is disposed at a corner position of a surface of the first casing member 25, and is adjacent to the welded connection region 27. A maximum vertical distance between a side of the explosion-proof valve 10 facing the welded connection region 27 and the first region 271 is a, a maximum vertical distance between the side of the explosion-proof valve 10 facing the welded connection region 271 and the second region 272 is b, and a minimum vertical distance between the side of the explosion-proof valve 10 facing the welded connection region 27 and the corner region 273 is c, and $0.8 \leq a/b \leq 1.2$, $a<c$, and $b \ll c$ are satisfied.

The battery provided by an embodiment of the disclosure includes the explosion-proof valve 10 and the battery casing 20. The explosion-proof valve 10 is disposed on the battery casing 20, such that when the internal pressure of the battery casing 20 reaches a predetermined value, the explosion-proof valve 10 is able to be broken through to achieve an explosion-proof effect. The first casing member 25 and the second casing member 26 of the battery casing 20 are welded and form the welded connection region 27 between the first casing member 25 and the second casing member 26. By arranging the maximum vertical distance between the side of the explosion-proof valve 10 facing the welded connection region 27 and the first region 271 to be a, the maximum vertical distance between the side of the explosion-proof valve 10 facing the welded connection region 271 and the second region 272 to be b, and the minimum vertical distance between the side of the explosion-proof valve 10 facing the welded connection region 27 and the corner region 273 to be c, and by setting $0.8 \leq a/b \leq 1.2$, $a<c$, and $b \ll c$, the portion of the explosion-proof valve 10 close to the corner region 273 may be prevented from exploding prematurely. Further, it is ensured that when the internal pressure of the battery casing 20 reaches the predetermined value, the explosion-proof valve 10 may explode, and the safety performance of the battery is thereby improved.

It is noted that as the first casing member 25 and the second casing member 26 are welded, a sealed space is formed. The welding of the first casing member 25 and the second casing member 26 forms the welded connection region 27. The welded connection region 27 herein may be considered as the location with a welded seam. For instance, the battery is generally a square battery, and the first casing member 25 and the second casing member 26 are disposed separately, so the welded connection region 27 generally encloses a rectangular space. Herein, the welded connection region 27 may include four corner regions 273, and when the first casing member 25 and the second casing member 26 are welded, the strength of the welded seam of each of the four corner regions 273 is low. Therefore, if the distance between the explosion-proof valve 10 and the corner region 273 are excessively small, the explosion-proof valve 10 may explode easily, resulting in the problem that the explosion pressure of the explosion-proof valve 10 is uncontrollable. However, in this embodiment, by making the distance between the explosion-proof valve 10 and the corner region 273 larger than the distance between the explosion-proof valve 10 and the first region 271 and the distance between the explosion-proof valve 10 and the second region 272, the explosion pressure of the explosion-proof valve 10 may be controlled, thereby ensuring that the explosion-proof valve 10 may achieve reliable safety protection.

The explosion-proof valves 10 are disposed at the corner positions of a surface of the first casing member 25, and in this way, the positions of the explosion-proof valves 10 may be reasonably arranged, and further, the gas or liquid inside the battery casing 20 may be prevented from spraying towards the adjacent batteries after the explosion-proof valves 10 explode, so the adjacent batteries are prevented from being affected.

In an embodiment, by allowing the following equations of $a \leq 20$ mm, $b \leq 20$ mm, and $c \leq 35$ mm, the explosion-proof valve 10 may be ensured to be close to the circumferential outer edge of the battery casing 20, and the explosion pressure of the explosion-proof valve 10 may be controlled, thereby ensuring that the explosion-proof valve 10 may achieve reliable safety protection. Further, $a \leq 15$ mm, $b \leq 15$ mm and $c \leq 25$ mm are satisfied.

In an embodiment, the corner region 273 extends in a curve direction. That is, the strength of the welded seam formed by the corner region 273 is relatively weak, so it is necessary to ensure that the distances between the explosion-proof valve 10 and the corner region 273 are relatively large so as to prevent the explosion-proof valve 10 from exploding prematurely.

In an embodiment, the first region 271 and the second region 272 extend respectively in a first straight line direction and a second straight line direction, and the first straight line direction is perpendicular to the second straight line direction. The transition between the first region 271 and the second region 272 is made through the corner region 273 extended by the curve. Therefore, the strength of the welded seam between the first region 271 and the second region 272 is relatively high, so that the distance between the explosion-proof valves 10 and the corner region 273 is relatively large, and the distance between the explosion-proof valve 10 and the first region 271 and the distance between the explosion-proof valve 10 and the second region 272 are relatively small. In this way, the explosion pressure of the explosion-proof valve 10 may be controlled, thereby ensuring that the explosion-proof valve 10 may achieve reliable safety protection.

In an embodiment, the maximum vertical distance between the side of the explosion-proof valve 10 facing the welded connection region 27 and the first region 271 is substantially equal to the maximum vertical distance between the side of the explosion-proof valve 10 facing the welded connection region 27 and the second region 272, that is, $a=b$. In this way, the explosion-proof valve 10 may explode easily, and the explosion pressure of the explosion-proof valve 10 may be controlled.

Figure 5:
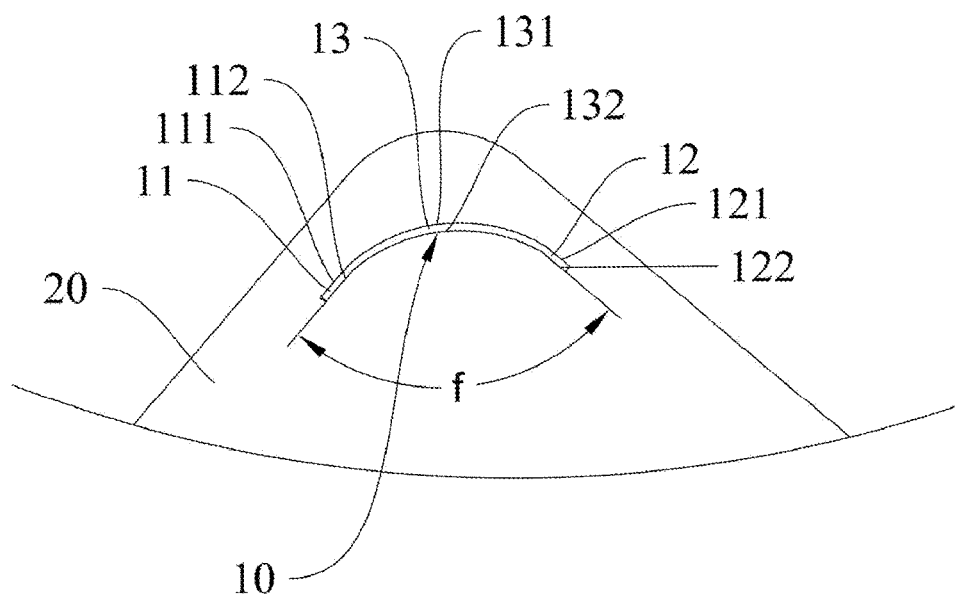
FIG. 5 is a schematic local view illustrating the structure of the battery according to a first exemplary embodiment.
Figure 6:
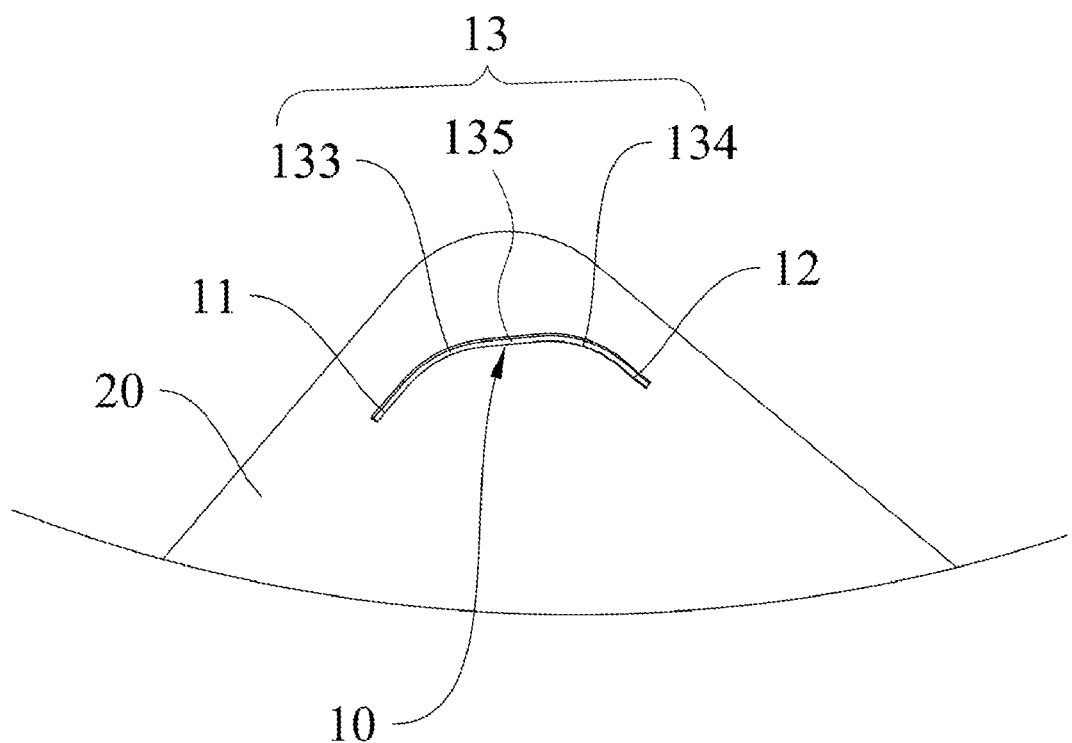
FIG. 6 is a local schematic view illustrating the structure of the battery from a viewing angle according to a second exemplary embodiment.
Figure 7:
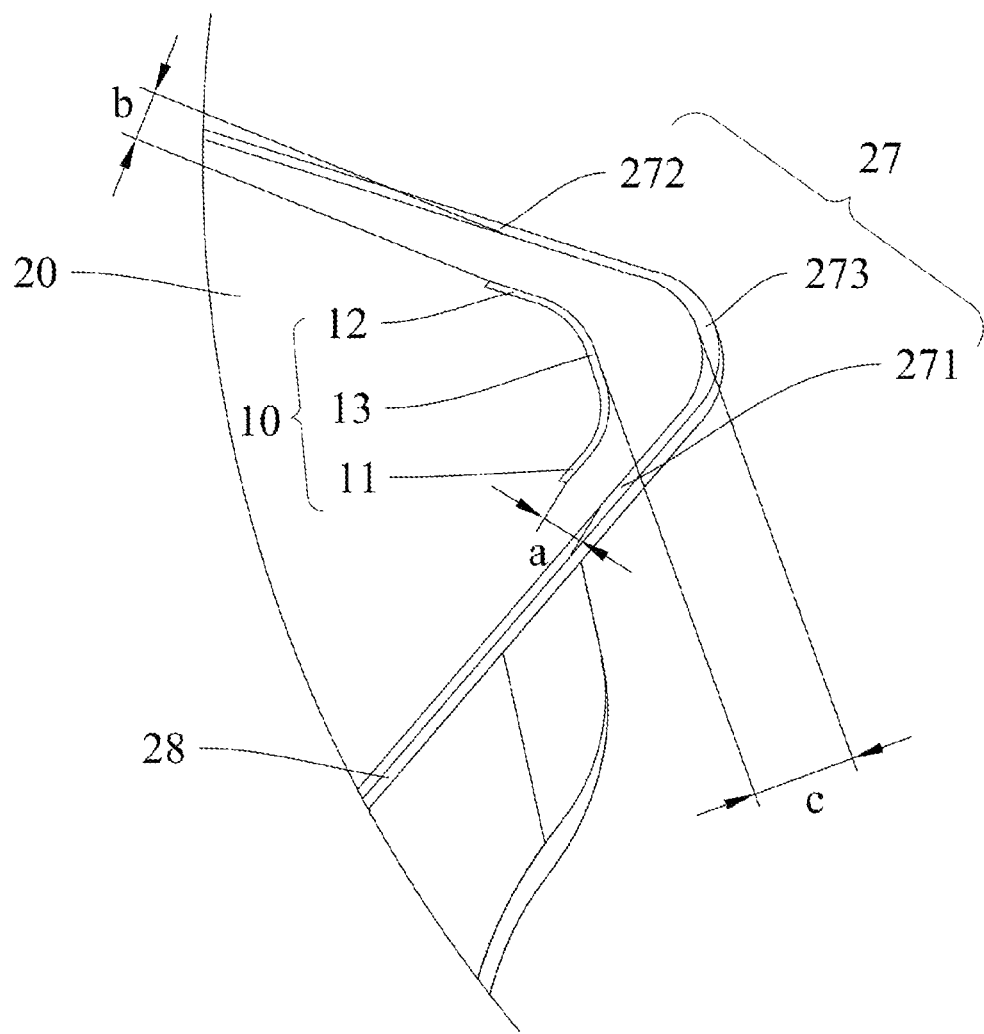
FIG. 7 is a local schematic view illustrating the structure of the battery from another viewing angle according to the second exemplary embodiment.
Figure 8:
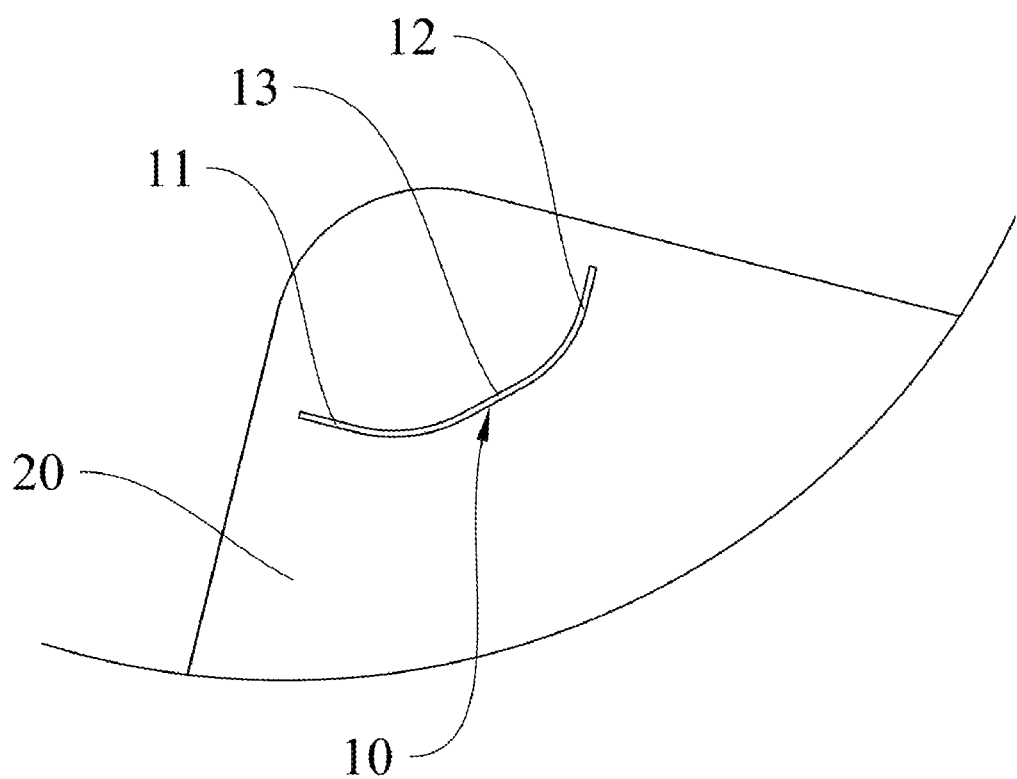
FIG. 8 is a local schematic view illustrating the structure of the battery from another viewing angle according to a third exemplary embodiment.

In an embodiment, as shown in FIG. 5 to FIG. 7, each explosion-proof valve 10 includes a first straight line segment 11, a second straight line segment 12, and a middle segment 13. Two ends of the middle segment 13 are respectively connected to the first straight line segment 11 and the second straight line segment 12. An included angle between the first straight line segment 11 and the second straight line segment 12 is f, and $45° \leq f \leq 135°$ is satisfied. When the internal pressure of the battery casing 20 reaches the predetermined value, at least one of the first straight line segment 11, the second straight line segment 12, and the middle segment 13 is able to be broken through. A maximum vertical distance between the first straight line segment 11 and the first region 271 is a, a maximum vertical distance between the second straight line segment 12 and the second region 272 is b, and a minimum vertical distance between the middle segment 13 and the corner region 273 is c. By arranging the first straight line segment 11, the second straight line segment 12, and the middle segment 13 and by arranging an included angle between the first straight line segment 11 and the second straight line segment 12, it is ensured that at least one of the first straight line segment 11, the second straight line segment 12, and the middle segment 13 is able to be broken through when the internal pressure of the battery casing 20 reaches the predetermined value. In this way, a reliable explosion-proof effect is achieved, and the safety performance of the battery is improved.

With reference to FIG. 7 again, the maximum vertical distance between the first straight line segment 11 and the first region 271 is a, the maximum vertical distance between the second straight line segment 12 and the second region 272 is b, and the minimum vertical distance between the middle segment 13 and the corner region 273 is c, and $0.8 \leq a/b \leq 1.2$, $a<c$, and $b<c$ are satisfied. In this way, at least one of the first straight line segment 11, the second straight line segment 12, and the middle segment 13 is able to be broken through when the internal pressure of the battery casing 20 reaches the predetermined value, and the problem of premature explosion is prevented from occurring.

Each explosion-proof valve 10 includes the first straight line segment 11, the second straight line segment 12, and the middle segment 13. The first straight line segment 11 may extend in the first straight line direction, and the second straight line segment 12 may extend in the second straight line direction. When the internal pressure of the battery casing 20 reaches the predetermined value, at least one of the first straight line segment 11, the second straight line segment 12, and the middle segment 13 is able to be broken through. That is, the first straight line segment 11, the second straight line segment 12, and the middle segment 13 may be treated as the fragile regions of each explosion-proof valve 10, so that the explosion-proof effect may be achieved, the gas inside the battery casing 20 may be discharged in time, and safety problems are thus prevented from occurring.

With reference to FIG. 5 again, the included angle between the first straight line segment 11 and the second straight line segment 12 is f, and $45° \leq f \leq 135°$ is satisfied. In this way, the stress is prevented from being excessively large and uncontrollable while achieving stress concentration, as such, it is ensured that the explosion-proof valve 10 is able to explode when the internal pressure of the battery casing 20 reaches the predetermined value, and that the internal pressure of the battery casing 20 is released, and the safety performance of the battery is improved.

In an embodiment, the included angle f between the first straight line segment 11 and the second straight line segment 12 may be 45°, 48°, 50°, 55°, 58°, 60°, 65°, 70°, 75°, 78°, 80°, 85°, 88°, 90°, 95°, 100°, 105°, 110°, 120°, 125°, 130°, 132°, or 135° and the so on.

It should be noted that the distance between the two components refers to the distance between the sides where the two components are close to each other. For instance, the distance between the first straight line segment 11 and the first region 271 represents the distance between the side of the first straight line segment 11 facing the first region 271 and the side of the first region 271 facing the first straight line segment 11.

In an embodiment, the middle segment 13 includes a curve segment, such that stress concentration may be reduced, and it is ensured that the explosion pressure of the explosion-proof valve 10 is controllable, and the problem of accidental explosion is prevented from occurring. The curve segment may be a circular arc segment, or the curve segment may be a non-circular arc segment.

In an embodiment, the first straight line segment 11 is connected to the curve segment, and/or the second straight line segment 12 is connected to the curve segment. In this way, stress concentration at the connection point between the first straight line segment 11 and the middle segment 13 and stress concentration at the connection point between the second straight line segment 12 and the middle segment 13 may be avoided, thus the explosion pressure of the explosion-proof valve 10 may be effectively controlled, and safety performance of the battery is improved.

In an embodiment, as shown in FIG. 5, the middle segment 13 is configured to be a circular arc segment, such that the stress concentration at the connection point between the first straight line segment 11 and the middle segment 13 and stress concentration at the connection point between the second straight line segment 12 and the middle segment 13 may be avoided, the stress may be uniformly distributed, and the explosion pressure of the explosion-proof valve 10 may thus be controlled.

In an embodiment, as shown in FIG. 6 and FIG. 7, the middle segment 13 includes a first segment 133, a second segment 134, and a third segment 135. Two ends of the third segment 135 are respectively connected to the first segment 133 and the second segment 134, and the first segment 133 and the second segment 134 are respectively connected to the first straight line segment 11 and the second straight line segment 12. Both the first segment 133 and the second segment 134 are circular arc segments, and the third segment 135 is a straight line segment. In this way, it is ensured that the transition between the first straight line segment 11 and the third segment 135 is made through the circular arc segment, and the transition between the second straight line segment 12 and the third segment 135 is made through the circular arc segment, such that stress concentration is prevented from being excessively large, and the explosion pressure of the explosion-proof valve 10 can be controlled while the explosion-proof valve 10 explodes.

In an embodiment, the width of the first straight line segment 11 ranges from 0.1 mm to 1 mm, the range of the second straight line segment 12 ranges from 0.1 mm to 1 mm, and the range of the middle segment 13 ranges from 0.1 mm to 1 mm. In this way, at least one of the first straight line segment 11, the second straight line segment 12, and the middle segment 13 is able to be broken through under a predetermined pressure, the structural strength is relatively high, and accidental explosion of the explosion-proof valve 10 is prevented from occurring when the internal pressure of the battery is not greater than the predetermined value.

The first straight line segment 11, the second straight line segment 12, and the middle segment 13 may all be understood as weak structures, so explosion is going to occur when the internal pressure of the battery casing 20 reaches the predetermined value. Each of the first straight line segment 11, the second straight line segment 12, and the middle segment 13 may have a specific width value, so that the gas may be quickly discharged from the inside of the battery casing 20 while facilitating the explosion, and safety problems are thus prevented from occurring. The width of the first straight line segment 11 ranges from 0.1 mm to 1 mm, the width of the second straight line segment 12 ranges from 0.1 mm to 1 mm, and the width of the middle segment 13 ranges from 0.1 mm to 1 mm. In this way, the explosion-proof valve 10 is ensured to explode, the gas may be quickly discharged after the explosion takes place, and the first straight line segment 11, the second straight line segment 12, and the middle segment 13 may also exhibit certain structural strength.

In an embodiment, the width of the first straight line segment 11 may be 0.1 mm, 0.15 mm, 0.2 mm, 0.22 mm, 0.25 mm, 0.3 mm, 0.35 mm, 0.4 mm, 0.45 mm, 0.48 mm, 0.5 mm, 0.52 mm, 0.65 mm, 0.7 mm, 0.75 mm, 0.8 mm, 0.85 mm, 0.9 mm, 0.95 mm, or 1 mm and so on.

The width of the second straight line segment 12 may be 0.1 mm, 0.15 mm, 0.18 mm, 0.2 mm, 0.22 mm, 0.25 mm, 0.3 mm, 0.35 mm, 0.4 mm, 0.45 mm, 0.48 mm, 0.5 mm, 0.52 mm, 0.6 mm, 0.7 mm, 0.75 mm, 0.8 mm, 0.85 mm, 0.9 mm, 0.95 mm, or 1 mm and so on.

The width of the middle segment 13 may be 0.1 mm, 0.15 mm, 0.18 mm, 0.2 mm, 0.22 mm, 0.3 mm, 0.35 mm, 0.4 mm, 0.45 mm, 0.48 mm, 0.5 mm, 0.52 mm, 0.6 mm, 0.65 mm, 0.7 mm, 0.8 mm, 0.85 mm, 0.9 mm, 0.95 mm, or 1 mm and so on.

In an embodiment, the widths of the first straight line segment 11, the second straight line segment 12, and the middle segment 13 are the same, so that the processing and molding of the structure may be conveniently performed, the molding efficiency of the explosion-proof valve 10 is improved, and the molding efficiency of the battery is also increased.

Figure 2:
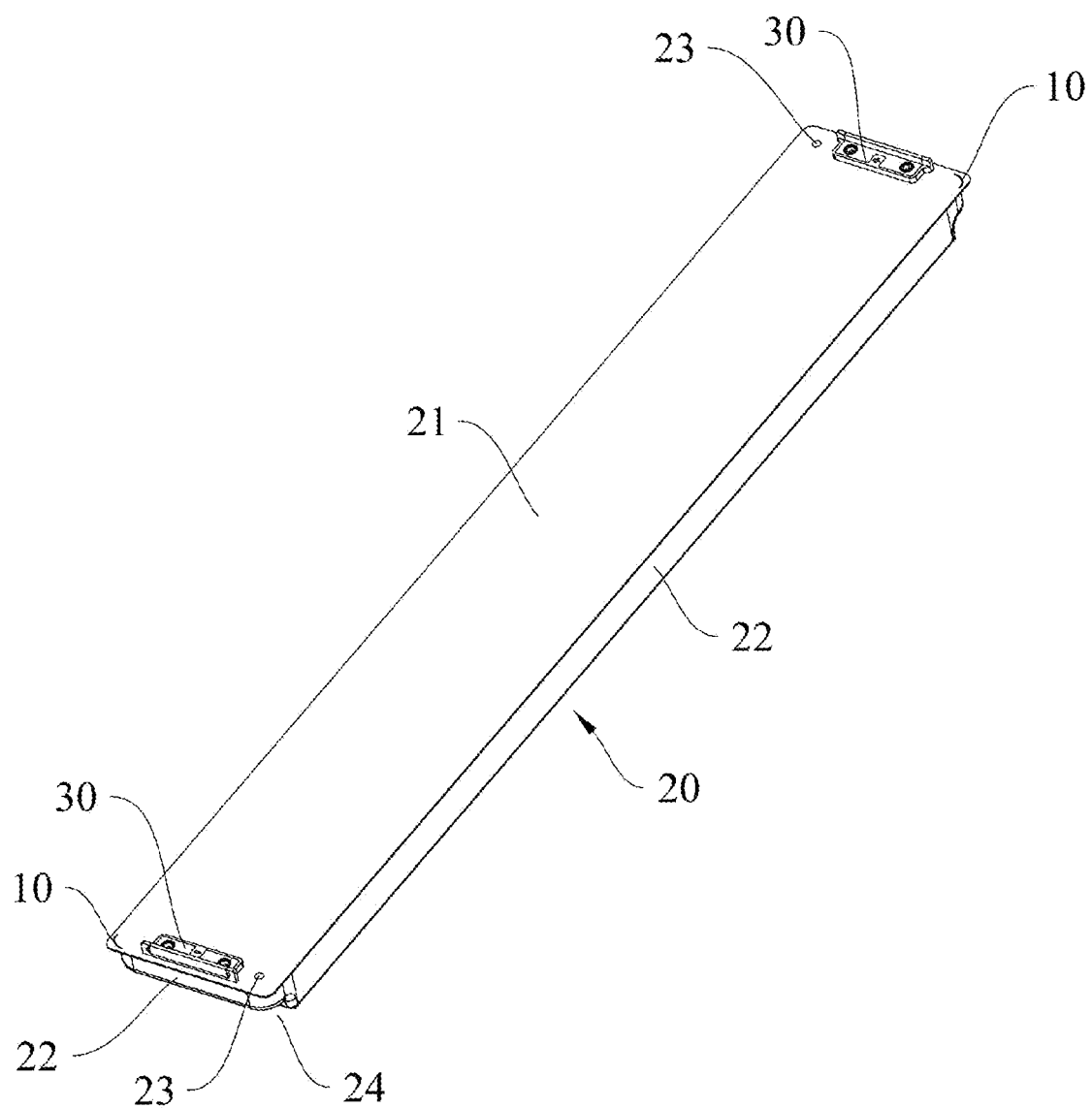
FIG. 2 is a schematic view illustrating the structure of the battery from a first viewing angle according to an exemplary embodiment.
Figure 3:
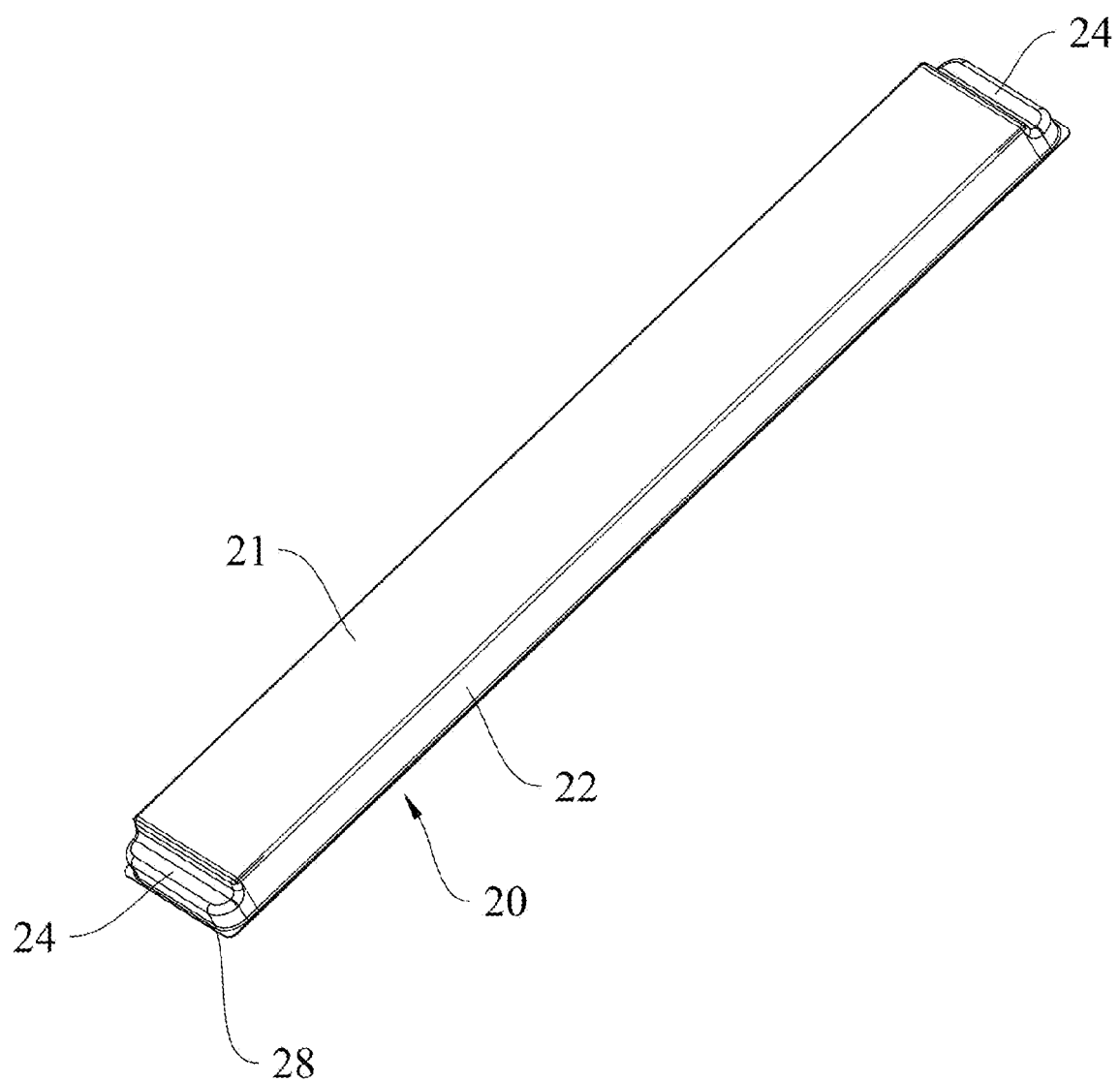
FIG. 3 is a schematic view illustrating the structure of the battery from a second viewing angle according to an exemplary embodiment.

In an embodiment, as shown in FIG. 2 and FIG. 3, the battery casing 20 includes two opposite first surfaces 21 and four second surfaces 22 surrounding the first surfaces 21. An area of each first surface 21 is greater than an area of each second surface 22, and the explosion-proof valves 10 are disposed in corner regions of the first surfaces 21 of the first casing member 25. The first straight line segment 11 and the second straight line segment 12 are respectively parallel to the two adjacent second surfaces 22. Further, the first straight line segment 11 is substantially parallel to the corresponding second surface 22 adjacent thereto, and the second straight line segment 12 is substantially parallel to the corresponding second surface 22 adjacent thereto, so that the distance between the first straight line segment 11 and one of the second surfaces 22 may be uniform, and the distance between the second straight line segment 12 and one of the second surfaces 22 may be uniform. In this way, stress may be easily concentrated, such that the explosion-proof valves 10 may easily explode, and that the safety performance of the battery is thereby improved.

The first straight line segment 11 and the second straight line segment 12 are respectively parallel to the two adjacent second surfaces 22, so that the first straight line segment 11 and the second straight line segment 12 may basically form a cantilever symmetrical structure. In this way, stress concentration may be easily achieved, such that the problem that the explosion-proof valves 10 are difficult to explode due to an excessively large length difference between the first straight line segment 11 and the second straight line segment 12 is avoided.

The corner regions of the first surfaces 21 may be understood as the location region where both ends of each diagonal line of the first surface 21 are located. The first surface 21 may be a substantially rectangular surface, and in this case, the first surface 21 may have four corner regions.

In an embodiment, as shown in FIG. 5 to FIG. 7, at least a portion of the middle segment 13 protrudes towards the circumferential edge of the first surface 21. That is, at least a portion of the middle segment 13 is disposed close to the circumferential edge of the first surface 21, so that the distance between the middle segment 13 and the corner region of the circumferential edge of the first surface 21 may be relatively small.

In an embodiment, the battery casing 20 includes two opposite first surfaces 21 and four second surfaces 22 surrounding the first surfaces 21. The explosion-proof valves 10 are disposed in the corner regions of the first surfaces 21, and the first straight line segment 11 and the second straight line segment 12 are perpendicular to the two adjacent second surfaces 22. Further, the first straight line segment 11 is substantially perpendicular to the corresponding second surface 22 adjacent thereto, and the second straight line segment 12 is substantially perpendicular to the corresponding second surface 22 adjacent thereto, so that the distance between the first straight line segment 11 and one of the second surfaces 22 is relatively small, and the distance between the second straight line segment 12 and one of the second surfaces 22 is relatively small. In this way, the explosion-proof valves 10 may explode easily, and safety performance of the battery is thereby improved.

In an embodiment, at least a portion of the middle segment 13 protrudes towards a middle region of the first surface 21. That is, at least a portion of the middle segment 13 is disposed away from the circumferential edge of the first surface 21, such that the distance value between the middle segment 13 and the corner region 273 may be controlled, and the explosion pressure of the explosion-proof valves 10 is thereby controlled.

It should be noted that, at least a portion of the middle segment 13 protrudes towards a specific position, or at least a portion of the middle segment 13 protrudes away from a specific position, which mainly reflects the orientation of the middle segment 13. For example, taking at least a portion of the middle segment 13 protruding towards the circumferential edge of the first surface 21 as an example, with reference to FIG. 7, the first straight line segment 11, the middle segment 13, and the second straight line segment 12 forming each explosion-proof valve 10 generally form a bent structure, and the explosion-proof valve 10 as a whole may be considered as protruding towards the circumferential edge of the first surface 21, that is, an opening formed by the explosion-proof valve 10 is disposed away from the corner region of the circumferential edge. Taking at least a portion of the middle segment 13 protruding towards the middle region of the first surface 21 as an example, with reference to FIG. 8, the first straight line segment 11, the middle segment 13, and the second straight line segment 12 forming each explosion-proof valve 10 generally form a bent structure, and the explosion-proof valve 10 as a whole may be considered as protruding away from the circumferential edge of the first surface 21, that is, the opening formed by the explosion-proof valve 10 is disposed towards the corner region of the circumferential edge.

It should be noted that the basic and general results obtained in the examples are obtained when processing errors, installation errors, etc. are considered. For instance, in the case that the first straight line segment 11 is substantially parallel to the second surface 22 adjacent thereto, and the second straight line segment 12 is substantially parallel to the second surface 22 adjacent thereto, when the processing errors, installation errors, etc. are ignored, it can be considered that the first straight line segment 11 is parallel to the second surface 22 adjacent thereto, and the second straight line segment 12 is parallel to the second surface 22 adjacent thereto. Correspondingly, in the case that the first straight line segment 11 is substantially perpendicular to the second surface 22 adjacent thereto, and the second straight line segment 12 is substantially perpendicular to the second surface 22 adjacent thereto, when the processing errors, installation errors, etc. are ignored, it can be considered that the first straight line segment 11 is perpendicular to the second surface 22 adjacent thereto, and the second straight line segment 12 is perpendicular to the second surface 22 adjacent thereto.

In some embodiments, it is not excluded that a specific included angle is provided between the first straight segment 11 and the second surface 22 adjacent thereto, for example, the included angle between the first straight segment 11 and the second surface 22 adjacent thereto ranges from 0° to 15°. A specific included angle is provided between the second straight segment 12 and the second surface 22 adjacent thereto, for example, the included angle between the second straight segment 12 and the second surface 22 adjacent thereto ranges from 0° to 15°.

Correspondingly, it is not excluded that a specific included angle is provided between the first straight segment 11 and the second surface 22 adjacent thereto, for example, the included angle between the first straight segment 11 and the second surface 22 adjacent thereto ranges from 60° to 90°. A specific included angle is provided between the second straight segment 12 and the second surface 22 adjacent thereto, for example, the included angle between the second straight segment 12 and the second surface 22 adjacent thereto ranges from 60° to 90°.

In an embodiment, as shown in FIG. 2 and FIG. 3, the battery casing 20 includes two opposite first surfaces 21 and four second surfaces 22 surrounding the first surfaces 21. The area of each first surface 21 is greater than the area of each second surface 22, and the explosion-proof valves 10 are respectively disposed in the corner regions of the first surfaces 21 of the first casing member 25. Therefore, the explosion-proof valves 10 may be made as close to the edge of the first surface 21 as possible. In this way, the space of the battery casing 20 may be well utilized, and the probability that the gas and liquid in the battery casing 20 spray towards the adjacent batteries after the explosion-proof valves 10 explode may be reduced.

In an embodiment, the first casing member 25 is a flat plate, which has a simple structure is provided, such that the explosion-proof valves 10 may be conveniently arranged, and the molding efficiency of the battery is thereby improved.

In one embodiment, the explosion-proof valves 10 and the battery casing 20 may be separately arranged. That is, the battery casing 20 may be provided with explosion-proof holes, and the explosion-proof valves 10 are connected onto the battery casing 20 to shield the explosion-proof holes. In this case, each explosion-proof valve 10 may include the first straight line segment 11, the second straight line segment 12, and a middle segment 13. As such, the first straight line segment 11, the second straight line segment 12, and the middle segment 13 may act as the fragile region of the explosion-proof valve 10, so that when the internal pressure of the battery casing 20 reaches the predetermined value, the fragile region explodes to achieve pressure relief.

In an embodiment, the explosion-proof valve 10 and at least a portion of the battery casing 20 are an integrally-formed structure, it thus can be seen that a simple structure is provided, manufacturing processes may be decreased, and the molding efficiency of the explosion-proof valve 10 is increased.

The explosion-proof valve 10 and at least a portion of the battery casing 20 being the integrally-formed structure means that, for example, portions of the battery casing 20 may be thinned to form the explosion-proof valve 10. Alternatively, portions of the battery casing 20 may be thinned during the molding process to serve as the explosion-proof valve 10 to achieve pressure relief. The process is relatively simple, so that the molding efficiency of the explosion-proof valve 10 may be improved.

In an embodiment, each explosion-proof valve 10 includes a fragile portion, such that when the internal pressure of the battery casing 20 reaches the predetermined value, the fragile portion is able to be broken through. A maximum vertical distance between a side of the fragile portion facing the welded connection region 27 and the first region 271 is a, a maximum vertical distance between a side of the fragile portion facing the welded connection region 27 and the second region 272 is b, and a minimum vertical distance between a side of the fragile portion facing the welded connection region 27 and the corner region 273 is c. The arrangement of the fragile portion is used to ensure that each explosion-proof valve 10 may explode under the predetermined pressure, so as to realize the pressure relief of the battery and ensure the safety performance of the battery.

The fragile portion may be a structure with a relatively thin thickness, the fragile portion may exhibit a relatively low material strength, or the fragile portion may have a relatively low connection strength.

In an embodiment, each explosion-proof valve 10 is provided with a notch, so that the explosion-proof valve 10 is formed with the fragile portion. That is, the fragile portion may be formed by material removal.

The notch may include a first notch, a second notch, and a third notch. Each explosion-proof valve 10 is provided with the first notch, the second notch, and the third notch, so that the explosion-proof valve 10 is formed with the first straight line segment 11, the second straight line segment 12, and the middle segment 13. That is, through arrangement of the first notch, the second notch, and the third notch on each explosion-proof valve 10, the explosion-proof valve 10 is thinned, the fragile portion is formed, the explosion-proof requirement is satisfied, and the pressure relief effect is thereby achieved.

The explosion-proof valve 10 and the battery casing 20 may be separately arranged. That is, the first notch, the second notch, and the third notch are formed on each explosion-proof valve 10, and the fragile portion of the explosion-proof valve 10 may be formed by the first straight line segment 11, the second straight line segment 12, and the middle segment 13.

The explosion-proof valve 10 and at least a portion of the battery casing 20 may be an integrally-formed structure. The battery casing 20 is provided with the first notch, the second notch, and the third notch, so that the battery casing 20 is formed with the first straight line segment 11, the second straight line segment 12, and the middle segment 13. That is, through arrangement of the first notch, the second notch, and the third notch on the battery casing 20, the battery casing is thinned, the fragile portion is formed, the explosion-proof requirement is satisfied, and the pressure relief effect is thereby achieved. The fragile portion of each explosion-proof valve 10 may be formed by the first straight line segment 11, the second straight line segment 12, and the middle segment 13.

It is noted that the first straight line segment 11 may extend in the first straight line direction, the second straight line segment 12 may extend in the second straight line direction, and the middle segment 13 may extend in a circular arc direction. Correspondingly, the first notch may extend in the first straight line direction, the second notch may extend in the second straight line direction, and the third notch may extend in the circular arc direction. Therefore, after the first notch, the second notch, and the third notch are formed, the first straight line segment 11, the second straight line segment 12, and the middle segment 13 may be formed on the battery casing 20, and the first straight line segment 11, the second straight line segment 12, and the middle segment 13 may act as the fragile portion of each explosion-proof valve 10.

In an embodiment, the width of the notch ranges from 0.1 mm to 1 mm. That is, the width of the first notch ranges from 0.1 mm to 1 mm, the width of the second notch ranges from 0.1 mm to 1 mm, and the width of the third notch ranges from 0.1 mm to 1 mm, and that the width of the first straight line segment 11 ranges from 0.1 mm to 1 mm, the width of the second straight line segment 12 ranges from 0.1 mm to 1 mm, and the width of the middle segment 13 ranges from 0.1 mm to 1 mm. That is, at least one of the first straight line segment 11, the second straight line segment 12, and the middle segment 13 is able to be broken through under the predetermined pressure, such that the structural strength is relatively high, and that the accidental explosion of the explosion-proof valve 10 is prevented from occurring when the internal pressure of the battery is not greater than the predetermined value.

In an embodiment, the width of the first notch may be 0.1 mm, 0.15 mm, 0.18 mm, 0.2 mm, 0.25 mm, 0.3 mm, 0.35 mm, 0.4 mm, 0.45 mm, 0.48 mm, 0.5 mm, 0.52 mm, 0.6 mm, 0.65 mm, 0.75 mm, 0.8 mm, 0.85 mm, 0.9 mm, 0.95 mm, or 1 mm and so on.

The width of the second notch may be 0.1 mm, 0.15 mm, 0.18 mm, 0.2 mm, 0.22 mm, 0.3 mm, 0.35 mm, 0.4 mm, 0.45 mm, 0.48 mm, 0.5 mm, 0.52 mm, 0.6 mm, 0.65 mm, 0.7 mm, 0.75 mm, 0.8 mm, 0.85 mm, 0.9 mm, 0.95 mm, or 1 mm and so on.

The width of the third notch may be 0.1 mm, 0.15 mm, 0.18 mm, 0.2 mm, 0.22 mm, 0.25 mm, 0.35 mm, 0.4 mm, 0.45 mm, 0.48 mm, 0.5 mm, 0.52 mm, 0.6 mm, 0.65 mm, 0.7 mm, 0.75 mm, 0.85 mm, 0.9 mm, 0.95 mm, or 1 mm and so on.

In an embodiment, a thickness of the battery casing is 20 is d, a depth of the notch is e, and $0.04\ mm \leq d-e \leq 1\ mm$ is satisfied. That is, the thickness range of each of the first straight line segment 11, the second straight line segment 12, and the middle segment 13 is 0.04 mm to 1 mm. In this way, it can be ensured that the explosion-proof valve 10 has a certain strength and the explosion-proof valves may explode under the predetermined pressure, and that the safety protection of the battery is thereby achieved.

In an embodiment, the thickness of each of the first straight line segment 11, the second straight line segment 12, and the middle segment 13 may be 0.04 mm, 0.05 mm, 0.1 mm, 0.2 mm, 0.3 mm, 0.4 mm, 0.5 mm, 0.6 mm, 0.65 mm, 0.7 mm, 0.8 mm, 0.9 mm, or 1 mm and so on.

In an embodiment, the notch has a gradually expanding structure, and the width of the notch gradually increases from a bottom end of the notch to a top end of the notch. That is, the first notch is of a gradually expanding structure, and the width of the first notch gradually increases from the bottom end of the first notch to the top end of the first notch. The second notch is of a gradually expanding structure, and the width of the second notch gradually increases from the bottom end of the second notch to the top end of the second notch. The width of the third notch gradually increases from the bottom end of the third notch to the top end of the third notch. Through the above arrangement, when the internal pressure of the battery casing 20 reaches the predetermined value, at least one of the first straight line segment 11, the second straight line segment 12, and the middle segment 13 is able to be broken through, and it is convenient for the gas and liquid in the battery casing 20 to be quickly discharged from the inside of the battery casing 20.

The longitudinal cross-sections of the first notch, the second notch, and the third notch may be substantially trapezoidal, or the bottom walls of the first notch, the second notch, and the third notch may be substantially arc surfaces.

In an embodiment, the first notch may be of an equidistant structure, that is, the width of the first notch is uniform from the bottom end of the first notch to the top end of the first notch. The second notch may be of an equidistant structure, that is, the width of the second notch is uniform from the bottom end of the second notch to the top end of the second notch. The third notch may be of an equidistant structure, that is, the width of the third notch is uniform from the bottom end of the third notch to the top end of the third notch.

The longitudinal cross-sections of the first notch, the second notch, and the third notch may be substantially trapezoidal, or the bottom walls of the first notch, the second notch, and the third notch may be substantially arc surfaces.

In an embodiment, with reference to FIG. 5 and FIG. 6 together, the first notch includes a first side wall 111 and a second side wall 112 opposite to each other, the second notch includes a third side wall 121 and a fourth side wall 122 opposite to each other, and the third notch includes a fifth side wall 131 and a sixth side wall 132 opposite to each other. The first side wall 111, the second side wall 112, the third side wall 121, and the fourth side wall 122 are all flat surfaces. Two ends of the fifth side wall 131 are respectively connected to the first side wall 111 and the third side wall 121, and two ends of the sixth side wall 132 are respectively connected to the second side wall 112 and the fourth side wall 122.

In an embodiment, as shown in FIG. 1 and FIG. 2, at least two explosion-proof valves 10 are provided, and the at least two explosion-proof valves 10 are located on the same side of the battery casing 20. Further, the at least two explosion-proof valves 10 are located on the same surface of the battery casing 20, so that the explosion-proof performance of the explosion-proof valves 10 may be improved, and the battery safety problem caused by the failure of explosion of one of the explosion-proof valves 10 may be prevented from occurring. By arranging the at least two explosion-proof valves 10 on the same side of the battery casing 20, the spraying directions of the gas and liquid inside the battery casing 20 may be conveniently controlled after the explosion-proof valves 10 explode, and safety performance of the battery is thereby improved.

In an embodiment, the at least two explosion-proof valves 10 are center-symmetrical with respect to the intersection of a first diagonal direction and a second diagonal direction of the battery casing 20. Therefore, the direction of the batteries may be adjusted according to the requirements of series or parallel connection among the batteries during the battery grouping process, and the adjustment of the direction of the batteries does not affect the explosion-proof valves 10 of the batteries, and the explosion-proof valves 10 may be basically located in the same direction.

It should be noted that the two explosion-proof valves 10 are center-symmetrical with respect to the intersection of the first diagonal direction and the second diagonal direction of the battery casing 20. That is, after one of the explosion-proof valves 10 is rotated 180 degrees around the intersection of the first diagonal direction and the second diagonal direction, the two explosion-proof valves 10 overlap.

Figure 4:
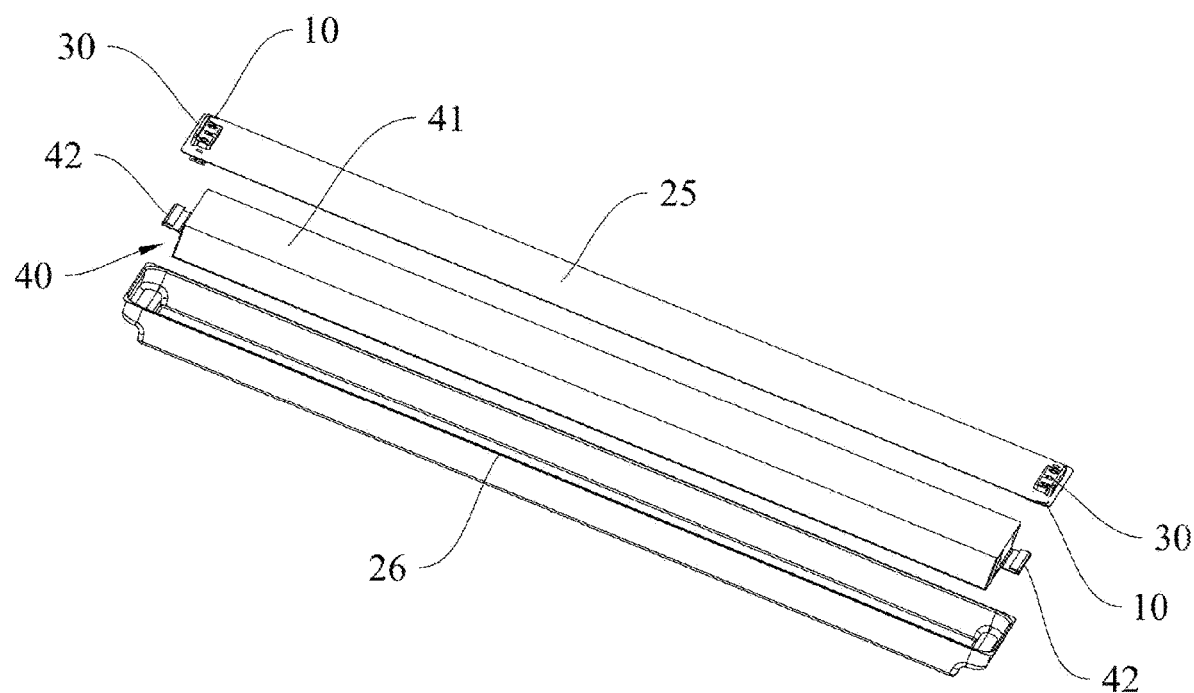
FIG. 4 is a schematic exploded view illustrating the structure of the battery according to an exemplary embodiment.

In an embodiment, as shown in FIG. 4, the battery further includes pole assemblies 30 and a cell 40. The cell 40 is disposed in the battery casing 20, the pole assemblies 30 are disposed in the battery casing 20, and the pole assemblies 30 are connected to the cell 40. The pole assemblies 30 are spaced apart from the explosion-proof valves 10, and the pole assemblies 30 and the explosion-proof valves 10 are disposed in a width direction of the battery casing 20. In this way, the pole assemblies 30 and the bus bar may be conveniently connected in the subsequent process, and the space of the battery casing 20 may be fully utilized. Therefore, it is ensured that structures such as the battery cell 40 may be reasonably arranged inside the battery casing 20, and the space of the battery casing 20 may be well utilized.

The pole assemblies 30 and the explosion-proof valves 10 may be located on the end portions of the battery casing 20, and the explosion-proof valves 10 are respectively located at the corner positions of the battery casing 20. For instance, the pole assemblies 30 and the explosion-proof valves 10 may be disposed on the first surface 21. Considering that the first surface 21 is the larger surface of the battery casing 20, sufficient support may be provided to the pole assemblies 30 to ensure the stability of the pole assemblies 30.

In an embodiment, as shown in FIG. 4, the cell 40 includes a cell body 41 and tab portions 42, and the tab portions 42 extend out in a length direction of the cell body 41. Herein, the tab portions 42 are respectively connected to the pole assemblies 30, and the pole assemblies 30 may be respectively disposed on the end portions of the battery casing 20. In this way, convenient connection may be achieved, and the length space of the battery may be fully utilized. The tab portions 42 may be directly connected to the pole assemblies 30, respectively, that is, the tab portions 42 and the pole assemblies 30 may be respectively and directly welded, or the tab portions 42 and the pole assemblies 30 may be respectively connected through metal adapters. Such connection may be specifically made through welding, and the use of riveting and other methods is not excluded, which is not limited herein.

It is noted that the cell body 41 includes two or more electrode pieces, each tab portion 42 includes two or more single-piece tabs, and the single-piece tabs extend from the corresponding electrode pieces. The width of each single-piece tab is less than the width of each electrode piece. Multiple single-piece tabs are stacked to form each tab portion 42 and are connected to the pole assembly 30. The tab portion 42 may be welded to the pole assembly 30. The single-piece tabs are made of metal foils with good electrical and thermal conductivity, such as aluminum, copper, or nickel.

In some embodiments, two pole assemblies 30 are provided, and the two pole assemblies 30 are respectively a positive pole assembly and a negative pole assembly. Each pole assembly may include two poles for increasing the overcurrent capability of the battery. Two tab portions 42 are also provided, and the two tab portions 42 are respectively a positive tab and a negative tab. The positive pole assembly is connected to the positive tab, and the negative pole assembly is connected to the negative tab.

It should be noted that the pole assembly 30 and the battery casing 20 may be insulated from each other. For instance, an insulating member may be used for insulation between the two, or an insulating coating may be used for insulation, which is not limited herein, and selection may be made according to actual needs. In some embodiments, it is not excluded that one pole assembly 30 may be electrically connected to the battery casing 20.

In an embodiment, as shown in FIG. 1 and FIG. 2, the battery casing 20 is provided with liquid injection holes 23, the liquid injection holes 23 are respectively spaced apart from the pole assemblies 30, and one pole assembly 30 is located between the explosion-proof valve 10 and the liquid injection hole 23. In this way, the space of the battery casing 20 may be well utilized, and the pole assemblies 30, the explosion-proof valves 10, and the liquid injection holes 23 may be reasonably arranged.

The liquid injection holes 23 are used to realize liquid injection into the interior of the battery casing 20, and sealing may be carried out through the sealing structure after the liquid injection is completed. At least two liquid injection holes 23 may be provided, and the at least two liquid injection holes 23 may be center-symmetrical with respect to the intersection of the first diagonal direction and the second diagonal direction of the battery casing 20.

In an embodiment, the battery casing 20 is provided with recesses 24, and the pole assemblies 30 are respectively located in the recesses 24, so that the pole assemblies 30 may be prevented from occupying the stacking space of a battery assembly, thereby improving the energy density of the battery assembly.

In an embodiment, as shown in FIG. 2 and FIG. 3, the battery casing 20 is provided with the recesses 24, the pole assemblies 30 and the recesses 24 are located on two opposite surfaces of the battery casing 20, and the recesses 24 are configured to accommodate the pole assemblies of another battery. In this way, when the batteries are grouped, the pole assemblies of the another battery may be respectively accommodated in the recesses 24, such that the pole assemblies are thus prevented from occupying the space between the two batteries, the distance between the two adjacent batteries is reduced, and the energy density of the battery assembly is thereby improved.

In an embodiment, as shown in FIG. 2 and FIG. 3, two pole assemblies 30 and two recesses 24 may be provided. The two pole assemblies 30 may be disposed on one of the first surfaces 21, and the two recesses 24 may be disposed on the other one of the first surfaces 21.

In an embodiment, as shown in FIG. 4, the battery casing 20 includes the first casing member 25 and the second casing member 26, and the second casing member 26 is connected to the first casing member 25 to seal the cell 40. Herein, the first casing member 25 is a flat plate and both the pole assemblies 30 and the explosion-proof valves 10 are disposed on the first casing member 25, such that a simple structure is provided, the pole assemblies 30 and the explosion-proof valves 10 may be conveniently arranged, and the molding efficiency of the battery is thereby improved.

In an embodiment, the material of the battery casing 20 may be stainless steel or aluminum featuring good corrosion resistance and sufficient strength.

It should be noted that, the first casing member 25 and the second casing member 26 may be independently arranged, as shown in FIG. 4. In some embodiments, it is not excluded that the first casing member 25 and the second casing member 26 may be an integral structure, and the space for accommodating the cell 40 is formed by stamping, and then welding is used for subsequent sealing and connection.

In an embodiment, the thickness of the battery casing 20 is 0.1 mm to 0.5 mm, such that the weight of the battery casing 20 may be reduced, and the energy density of the battery is increased. The thickness of each of the first casing member 25 and the second casing member 26 is 0.1 mm to 0.5 mm. The thickness of the battery casing 20 is relatively thin, and in this embodiment, the explosion-proof valves 10 may be directly disposed on the battery casing 20 to facilitate molding.

The thickness of the battery casing 20 may be 0.1 mm, 0.15 mm, 0.2 mm, 0.25 mm, 0.3 mm, 0.4 mm, 0.45 mm, or 0.5 mm and so on.

In an embodiment, as shown in FIG. 3 and FIG. 7, the first casing member 25 and the second casing member 26 form a flange structure 28, and the flange structure 28 includes the welded connection region 27. That is, the flange structure 28 is formed after the first casing member 25 and the second casing member 26 are welded, so that the welding stability of the first casing member 25 and the second casing member 26 is ensured. The flange structure 28 may also be used for positioning and dissipating heat when the batteries are grouped.

The first casing member 25 is provided with a flange, the second casing member 26 is provided with a flange, and the flange of the first casing member 25 and the flange of the second casing member 26 are welded to form the flange structure 28.

In an embodiment, a length of the battery is L, where 400 mm≤L≤2500 mm is satisfied, and a width of the battery is K and a height of the battery is H, where 2K≤L≤50K and/or 0.5H≤K≤20H is satisfied.

Further, the following equations of 50 mm≤K≤200 mm and 10 mm≤H≤100 mm are satisfied.

It is preferable that 4K≤L≤25K and/or 2H≤K≤10H are satisfied.

Regarding the battery provided in the foregoing embodiments, in the case where sufficient energy density is ensured, the ratio of the length to the width of the battery is larger, and further, the ratio of the width to the height of the battery is larger.

In an embodiment, the length of the battery is L, the width of the battery is K, and the equation of 4K≤L≤7K is satisfied. That is, the ratio of the length to the width of the battery in this embodiment is relatively large, and in this way, the energy density of the battery is increased, and subsequent formation of the battery assembly may also be conveniently performed.

In an embodiment, the height of the battery is H, and the equation of 3H≤K≤7H is satisfied. The ratio of the width to the height of the battery is relatively large, and in this way, under the condition that sufficient energy density is ensured, formation may be conveniently performed.

Optionally, the length of the battery may be 500 mm to 1500 mm, the width of the battery may be 80 mm to 150 mm, and the height of the battery may be 15 mm to 25 mm.

It should be noted that the length of the battery is the dimension in the length direction of the battery, the width of the battery is the dimension in the width direction of the battery, and the height of the battery is the dimension in the height direction of the battery, that is, the thickness of the battery.

In an embodiment, the battery is a laminated battery, which may be conveniently assembled and may further be processed to obtain a battery with a longer length.

The battery includes a cell and an electrolyte, which is the minimum unit capable of performing electrochemical reactions such as charging/discharging. The cell refers to a unit formed by winding or laminating a stacked portion, and the stacked portion includes a first electrode piece, a separator, and a second electrode piece. When the first electrode piece is a positive electrode piece, the second electrode piece is a negative electrode piece. The polarities of the first electrode piece and the second electrode piece may be interchanged.

To be specific, the cell 40 is a laminated cell, the cell 40 has first electrode pieces that are stacked on each other, second electrode pieces that are electrically opposite to the first electrode pieces, and diaphragm pieces disposed between the first electrode pieces and the second electrode pieces. Therefore, multiple pairs of the first electrode pieces and the second electrode pieces are stacked to form the laminated cell.

Optionally, the battery may be a roll core. That is, the first electrode pieces, the second electrode pieces that hast electrical properties opposite to the first electrode pieces, and the diaphragm pieces disposed between the first electrode pieces and the second electrode pieces are wound to obtain a roll core.

An embodiment of the disclosure further provides a battery assembly, and the battery assembly includes the abovementioned battery.

In an embodiment of the disclosure, the battery included in the battery assembly includes the explosion-proof valves 10 and the battery casing 20, and the explosion-proof valves 10 are disposed on the battery casing 20, such that when the internal pressure of the battery casing 20 reaches the predetermined value, the explosion-proof valves 10 are able to be broken through to achieve an explosion-proof effect. The first casing member 25 and the second casing member 26 of the battery casing 20 are welded and form the welded connection region 27 between the first casing member 25 and the second casing member 26. By arranging the maximum vertical distance between the side of each explosion-proof valve 10 facing the welded connection region 27 and the first region 271 to be a, the maximum vertical distance between the side of each explosion-proof valve 10 facing the welded connection region 271 and the second region 272 to be b, and the minimum vertical distance between the side of each explosion-proof valve 10 facing the welded connection region 27 and the corner region 273 to be c, and by setting the equations of 0.8≤a/b≤1.2, a<c, and b<c, the portion of each of the explosion-proof valves 10 close to the corner region 273 may be prevented from exploding prematurely. Further, it is ensured that when the internal pressure of the battery casing 20 reaches the predetermined value, the explosion-proof valves 10 may explode, and the safety performance of the battery assembly is thereby improved.

In an embodiment, the battery assembly is a battery module or a battery pack.

The battery module includes a plurality of batteries, and the battery module may further include end plates and side plates. The end plates and the side plates are configured to secure the batteries.

It is noted that a plurality of batteries may be formed into a battery module and then arranged in the battery box, and the plurality of batteries may be secured by the end plates and the side plates. The plurality of batteries may be directly disposed in the battery box, that is, the plurality of batteries are not required to be arranged into groups, and the end plates and the side plates may be removed at this time.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising:
a battery casing, including a first casing member and a second casing member, the first casing member and the second casing member are welded to form a welded connection region between the first casing member and the second casing member, the welded connection region comprises a first region, a second region, and a corner region, and two ends of the corner region are respectively connected to the first region and the second region; and
an explosion-proof valve, disposed at a corner position of a surface of the first casing member and adjacent to the welded connection region, wherein a maximum vertical distance between a side of the explosion-proof valve facing the welded connection region and the first region is a, a maximum vertical distance between the side of the explosion-proof valve facing the welded connection region and the second region is b, and a minimum vertical distance between the side of the explosion-proof valve facing the welded connection region and the corner region is c,
wherein 0.8≤a/b≤1.2, a<c, and b<c.

2. The battery according to claim 1, wherein a≤20 mm.

3. The battery according to claim 2, wherein c≤35 mm.

4. The battery according to claim 1, wherein the corner region extends in a curve direction.

5. The battery according to claim 4, wherein the first region and the second region extend respectively in a first straight line direction and a second straight line direction, and the first straight line direction is perpendicular to the second straight line direction.

6. The battery according to claim 5, wherein a=b.

7. The battery according to claim 1, wherein the explosion-proof valve comprises a first straight line segment, a second straight line segment, and a middle segment, two ends of the middle segment are respectively connected to the first straight line segment and the second straight line segment, an included angle between the first straight line segment and the second straight line segment is f, wherein 45°≤f≤135°, and at least one of the first straight line segment, the second straight line segment, and the middle segment is able to be broken through,
wherein a maximum vertical distance between the first straight line segment and the first region is a, a maximum vertical distance between the second straight line segment and the second region is b, and a minimum vertical distance between the middle segment and the corner region is c.

8. The battery according to claim 7, wherein the middle segment comprises a curve segment.

9. The battery according to claim 8, wherein the first straight line segment is connected to the curve segment, and/or the second straight line segment is connected to the curve segment.

10. The battery according to claim 9, wherein the middle segment is a circular arc segment.

11. The battery according to claim 9, wherein the middle segment comprises a first segment, a second segment, and a third segment, two ends of the third segment of the middle segment are respectively connected to the first segment of the middle segment and the second segment of the middle segment, and the first segment of the middle segment and the second segment of the middle segment are respectively connected to the first straight line segment and the second straight line segment,
wherein both the first segment of the middle segment and the second segment of the middle segment are circular arc segments, and the third segment of the middle segment is a straight line segment.

12. The battery according to claim 7, wherein the battery casing comprises two opposite first surfaces and four second surfaces surrounding the first surfaces, an area of each first surface is greater than an area of each second surface, and the explosion-proof valve is disposed in a corner region of one of the first surfaces of the first casing member,
wherein the first straight line segment and the second straight line segment are respectively parallel to adjacent two of the second surfaces.

13. The battery according to claim 1, wherein the battery casing comprises two opposite first surfaces and four second surfaces surrounding the first surfaces, an area of each first surface is greater than an area of each second surface, and the explosion-proof valve is disposed in a corner region of one of the first surfaces of the first casing member.

14. The battery according to claim 1, wherein the explosion-proof valve comprises a fragile portion, such that when an internal pressure of the battery casing reaches a predetermined value, the fragile portion is able to be broken through,
wherein a maximum vertical distance between a side of the fragile portion facing the welded connection region and the first region is a, a maximum vertical distance between the side of the fragile portion facing the welded connection region and the second region is b, and a minimum vertical distance between the side of the fragile portion facing the welded connection region and the corner region is c.

15. The battery according to claim 14, wherein the explosion-proof valve is provided with a notch, such that the explosion-proof valve forms the fragile portion.

16. The battery according to claim 15, wherein a width of the notch ranges from 0.1 mm to 1 mm.

17. The battery according to claim 15, wherein a thickness of the battery casing is d, and a depth of the notch is e, wherein 0.04 mm≤d-e≤1 mm.

18. The battery according to claim 15, wherein the notch has a gradually expanding structure, and a width of the notch gradually increases from a bottom end of the notch to a top end of the notch.

19. The battery according to claim 1, wherein the explosion-proof valve and at least a portion of the battery casing are an integrally-formed structure.

20. The battery according to claim 1, wherein a number of the explosion-proof valve is at least two, and the at least two explosion-proof valves are located on a same surface of the battery casing.

21. The battery according to claim 20, wherein the at least two explosion-proof valves are center-symmetrical about an intersection of a first diagonal direction and a second diagonal direction of the battery casing.

22. The battery according to claim 1, further comprising a pole assembly and a cell, wherein the cell is disposed in the battery casing, the pole assembly is disposed in the battery casing, and the pole assembly is connected to the cell, wherein the pole assembly is spaced apart from the explosion-proof valve, and the pole assembly and the explosion-proof valve are disposed in a width direction of the battery casing.

23. The battery according to claim 22, wherein the battery casing is provided with a liquid injection hole, the liquid injection hole is spaced apart from the pole assembly, and the pole assembly is located between the explosion-proof valve and the liquid injection hole.

24. The battery according to claim 22, wherein the battery casing is provided with a recess, the pole assembly is located in the recess, or the pole assembly and the recess are respectively located on two opposite surfaces of the battery casing, and the recess is configured to accommodate a pole assembly of another battery.

25. The battery according to claim 1, wherein the first casing member and the second casing member form a flange structure, and the flange structure comprises the welded connection region.

\* \* \* \* \*